United States Patent [19]  
Pettibone

[11] 4,306,732  
[45] Dec. 22, 1981

[54] DEPTH CONTROL FOR AGRICULTURAL IMPLEMENT

[75] Inventor: Richard Pettibone, Pullman, Wash.

[73] Assignee: J. E. Love Company, Pullman, Wash.

[21] Appl. No.: 101,816

[22] Filed: Dec. 10, 1979

[51] Int. Cl.³ .................... B62D 61/12; A01B 63/22
[52] U.S. Cl. ............................ 280/43.23; 172/327; 172/407; 172/413
[58] Field of Search ............ 280/43.23, 43.17, 414.5; 172/413, 407, 328, 327

[56] References Cited

U.S. PATENT DOCUMENTS

| | | | |
|---|---|---|---|
| 2,320,742 | 1/1943 | Newkirk | 172/328 |
| 2,348,445 | 5/1944 | Bayer | 280/43.23 X |
| 2,830,519 | 4/1958 | Chandler et al. | 280/43.23 X |
| 2,869,653 | 1/1959 | Smith | 172/413 X |
| 2,979,140 | 4/1961 | McKenzie | 280/43.23 X |
| 3,153,988 | 10/1964 | Warstler | 92/119 |
| 3,912,018 | 10/1975 | Brundage et al. | 280/414.5 X |

Primary Examiner—Joseph F. Peters, Jr.  
Assistant Examiner—Milton L. Smith  
Attorney, Agent, or Firm—Wells, St. John & Roberts

[57] ABSTRACT

A control for selectively setting the operating depth of a ground working agricultural tool without changing the elevated height of the tool when in the transport position. The control includes a ground supported wheel frame pivotally mounting a tool frame. The tool frame is pivoted on the wheel frame between a raised inoperative position and a lowered operative position by operation of a cylinder assembly. The cylinder assembly is pivoted at one end to the tool frame. Its remaining end is connected to a bracket on the wheel frame. The bracket includes a slot, slidably mounting the remaining end of the cylinder. The slot is aligned along an arc centered on the pivot axis of the cylinder at its one end when the tool frame is elevated to the inoperative position. The slot is inclined upwardly toward this pivot axis as the tool frame is lowered to the operative position. An adjustment on the bracket enables positioning of the remaining cylinder end within the slot without changing the stroke length of the cylinder. The adjustment can be operated to raise or lower the tool frame in relation to the wheel frame, thereby changing the operating depth. Such adjustments will not affect the transport position of the tool frame.

9 Claims, 4 Drawing Figures

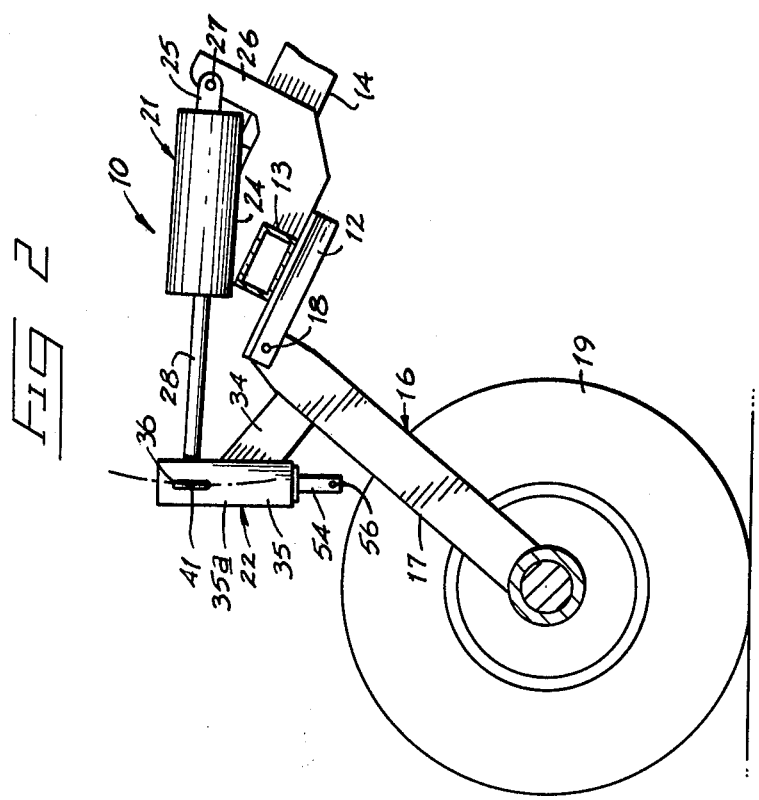
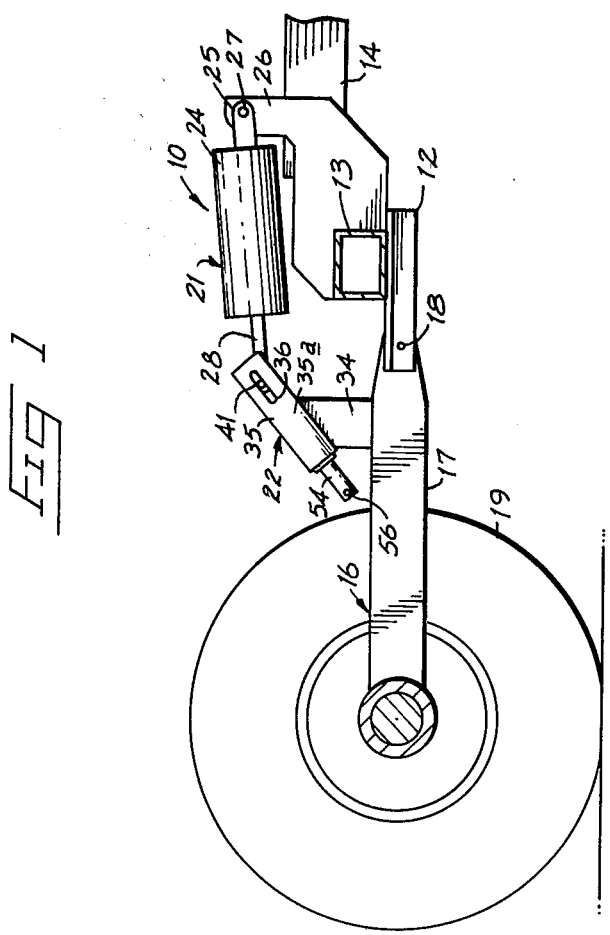

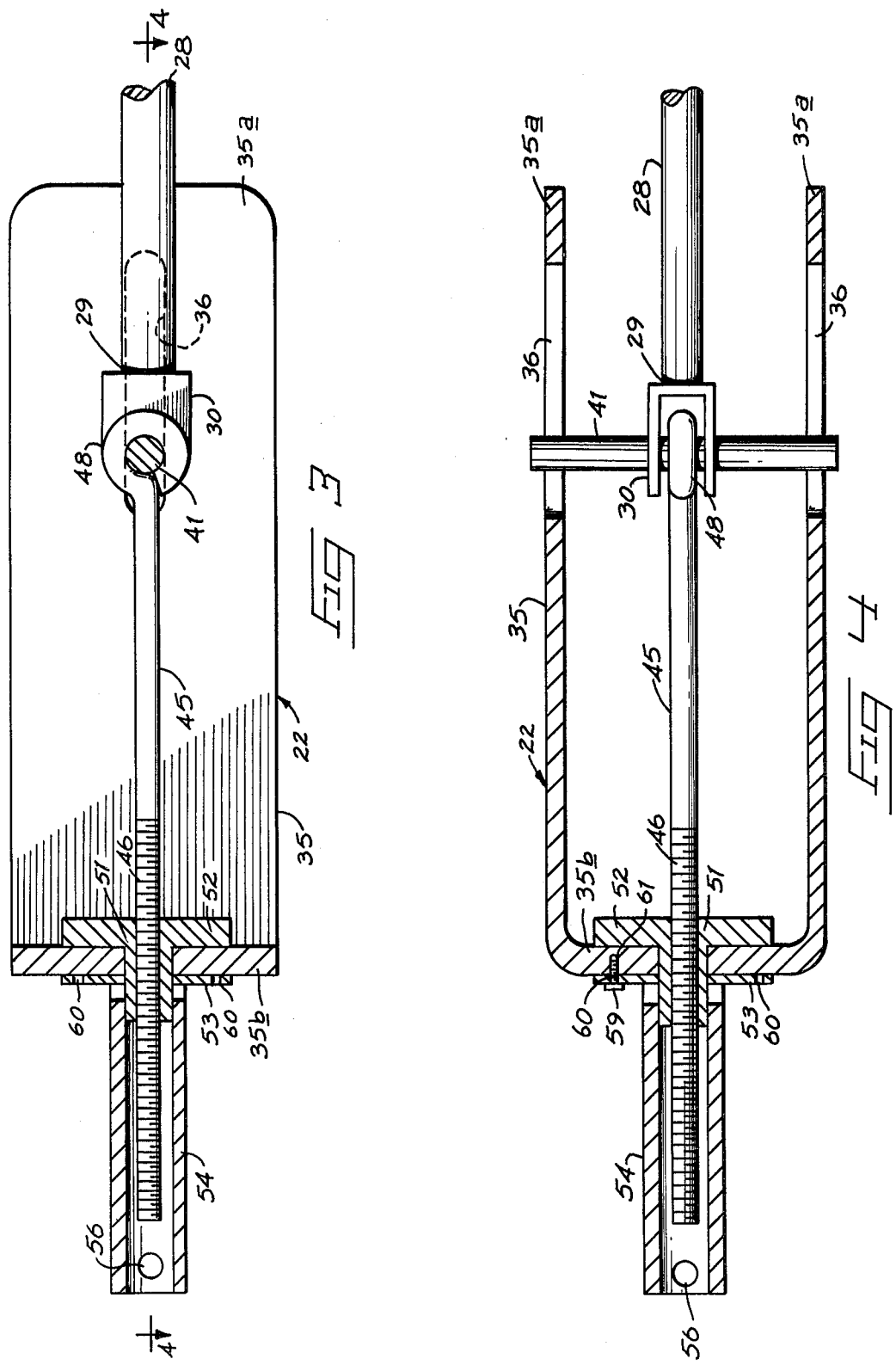

DEPTH CONTROL FOR AGRICULTURAL IMPLEMENT

BACKGROUND OF THE INVENTION

The present invention is related to apparatus for elevationally moving an agricultural implement between a ground engaging operative position and an above ground transport position.

Since variable stroke cylinder assemblies are both complicated and expensive, elevational adjustments in agricultural machinery have been typically achieved by mechanical devices external to the cylinder assemblies. However, where multiple cylinders are used side-by-side across the machinery, normal fluid leakage will result in the cylinder assemblies becoming out of phase with one another. Rephasing cylinders are available, but are corrective only at one or both ends of a cylinder stroke. It is therefore desirable to design a cylinder assembly adjustment that varies the working depth of an implement, but accommodates full extension and retraction for frequent rephasing purposes. A secondary result achieved herein is the maintenance of a constant travel position of the implement for all working depth adjustments.

One prior solution has been use of fixed stroke hydraulic cylinders with threadably adjustable extensions. The threaded extensions can be turned to extend or shorten the piston shaft of the cylinder and thereby locate the movable tool frame about its pivot axis. The threaded extensions work well to achieve a variable working depth of the tool, but the resulting transport position varies directly with the different working depth settings.

Another solution has been use of solid blocks that encircle the extended piston shaft and limit its available amount of contraction. This in turn limits rephasing of the cylinders to those times when the cylinders are fully extended.

U.S. Pat. No. 2,979,140 to McKenzie shows a moldboard plow frame construction wherein elevationally spaced abutments restrict the stroke of a wheel-tool frame connecting cylinder. The working depth of the tool can be varied, but the stroke limits are confined with the spacing of the abutments.

U.S. Pat. No. 2,320,742 to C. E. Newkirk shows a cylinder arrangement innerconnecting a pivoted wheel frame and a tool frame. The piston shaft includes a turnbuckle arrangement for setting the operating depth and transport height of the tool. The operating depth setting automatically determines the transport height.

U.S. Pat. No. 3,153,988 to H. E. Warspler discloses a pneumatic piston actuator with stroke adjustment features provided on the cylinder body. The stroke is variable at its extension but fixed upon retraction. A turnbuckle arrangement is provided on the piston shaft to selectively vary the shaft length. The stroke adjusting abutments on the cylinder body confine the piston to a stroke that is usually substantially less than its full length.

A problem presented by a fixed stroked cylinder being used for raising and lowering a ground working implement is well illustrated by U.S. Pat. No. 3,912,018 to J. F. Brundage et al. The Brundage mechanism includes a complex leveling system for holding a ground working tool level when hoisted to a transport position. If the level mechanism were not present, the implement would tilt awkwardly behind the towing vehicle upon actuation of the lift cylinder assembly to move the tool from its lowered working elevation.

The Chandler et al U.S. Pat. No. 2,830,519, illustrates in FIGS. 2 and 14 a stroke limiting device for selectively adjusting operating depth and transport height of a ground working tool. A threaded shaft on a pivoted frame member includes nuts on opposite sides of a fixed abutment. The nuts will engage and limit motion of the pivoted frame member at selected positions of the tool support. The nuts and abutments limit the otherwise full stroke of the cylinder.

Limitations placed on the stroke length as illustrated by the above referenced patents, inhibit "rephasing" of cylinders used in a hydraulic series across a large implement, since "rephasing" or synchronizing of the cylinders is normally accomplished only at full extension or retraction of the cylinders.

The present invention provides variable adjustment of operating depth for a ground working tool while maintaining a consistent transport height and utilizing the full cylinder stroke in both directions. This allows rephasing cylinders to be synchronized across the implement at each cylinder stroke. Adjustment of the operating depth has no affect on transport height, assuring that the ground working implement will be carried at a preselected height each time it is raised from the ground.

BRIEF DESCRIPTION OF THE DRAWINGS

FIG. 1 is a side elevational view of the present invention with a tool frame shown in a lowered operative position;

FIG. 2 is a view similar to FIG. 1 showing the tool frame in a raised transport position;

FIG. 3 is an enlarged sectional view taken through a portion of a bracket, pivot means, and elements connected thereto; and FIG. 4 is a sectional view of the bracket taken along line 4—4 in FIG. 3.

DETAILED DESCRIPTION OF A PREFERRED EMBODIMENT

The present invention is concerned with a depth control for mounting a ground working implement such as a plow, harrow, weeder, etc. (not shown) to a towing vehicle (also not shown) such as a tractor. The towing vehicle should have a pressurized hydraulic system for operating auxiliary equipment. Such systems are typically supplied with modern auxiliary equipment. The present depth control uses hydraulic pressure from such systems to selectively raise or lower the ground working implement between an operating ground engaging position and an inoperative transport position.

The present depth control is illustrated in the accompanying drawings and is generally designated therein by the reference character 10. The present depth control 10 basically includes a tool frame 12 having an elongated cross member 13 shown in end view in FIGS. 1 and 2. The cross member 13 mounts the ground engaging agricultural tool (not shown). A drawbar 14 extends forwardly from the cross member 13 for attachment to the towing vehicle.

A wheel frame 16 is pivotably attached to the tool frame 12 as another basic element of the present invention. The wheel frame 16 includes an elongated axle bar 17 mounted at a pivot 18 to the tool frame 12. The pivot 18 defines a first horizontal axis about which the tool frame and wheel frame pivot relative to one another. The axis bar 17 extends rearwardly from the pivot 18 to rotatably mount a wheel 19. The wheel engages and rolls along the ground surface to support the tool frame in its first elevational position shown as the elevated transport position (FIG. 2) and to limit the working depth of the implement when it is lowered to a second elevational position shown as the lowered operative position (FIG. 1).

Relative pivotal movement of the tool frame and wheel frame is accomplished by selective operation of a cylinder assembly 21 through an adjustable bracket assembly 22.

The cylinder assembly 21 includes a cylinder body 24. The body 24 has one end 25 pivotably connected to the tool frame 12. A first support shown as a rigid bracket 26 extends upwardly on the tool frame to pivotably support end 25 by a mounting pin 27. The pin 27 defines a second horizontal axis about which the cylinder assembly is free to pivot. The second horizontal axis is parallel to the first horizontal axis defined by pivot 18.

The cylinder assembly 21 should be of a type that permits rephasing of two or more units connected in a series hydraulic circuit. Such rephasing corrects for normal leakage or varying pressure losses among the cylinders by assuring a full stroke of each piston. This can be accomplished by a by-pass valve through the internal piston structure, operable when the cylinder reaches the end of its stroke. An exemplary cylinder and piston structure is shown in FIG. 13 of U.S. Pat. No. 3,240,008 while U.S. Pat. Re. No. 24,006 shows a valved rephasing system for agricultural purposes in FIGS. 2, 3, 5 and 7. Both prior disclosures are hereby incorporated by reference within this description.

The cylinder body 24 slidably carries a piston shaft 28. The shaft 28 extends to a remaining end 29 (FIGS. 3 and 4) of the assembly where a clevis 30 is mounted. The piston shaft 28 is supplied with known forms of seals and piston arrangements within the cylinder body 24 that, in response to applied hydraulic pressure, will cause the piston shaft to move between fully retracted (FIG. 1) and fully extended (FIG. 2) positions.

A second support shown as bracket assembly 22 is affixed to the wheel frame 16. It includes an upright standard 34 (FIGS. 1 and 2) on the axle bar 17. An upward end of the standard 34 rigidly mounts a U shaped yoke 35. The yoke includes elongated legs 35a and a transverse base 35b that are oriented with the base 35b facing the cylinder assembly 21. The legs 35a extend from the base toward the cylinder assembly 21.

A transverse pin 41 at the outer end of shaft 28 operatively connects the cylinder to bracket assembly 22 about a third horizontal axis that in turn is parallel to the above-described first and second axes. The bracket assembly includes guides, shown as open slots 36, which locate the pivotal connection at pin 41 along a path substantially aligned along an arc centered on the second axis when the tool frame 12 is at its first elevational position for travel purposes. Pin 41 is free to pivot within clevis 30 about its transverse axis and can slide and pivot within slots 36 in response to its adjustment and relative motion between the tool frame 12 and wheel frame 16.

The angular orientation of slots 36 while tool frame 12 is in its raised transport position is critical to proper operation of the present invention. The slots 36 must lie in substantial alignment along an arc (as shown by phantom lines in FIG. 2) that is centered on the second pivot axis at 27. The radius of the arc is equal to the fully extended length of the cylinder assembly.

The length of slots 36 may vary with the intended operational range or depth of the associated ground working implement. One extreme end of the slots will then represent the maximum operating depth, while the opposite end will represent the minimum operating depth. It may also be noted that the slots are illustrated as having straight side walls for ease in manufacture. However, the slot side walls can be formed with an arcuate configuration, coinciding with the arc at the clevis end of the cylinder assembly when it is in the fully extended position.

Selective positioning of pin 41 along the path defined by the slots or other equivalent mechanical guide arrangements will cause corresponding angular positioning of tool frame 12 relative to wheel frame 16. This angular relationship is utilized to vary the operating depth of the attached implement.

Positioning of pin 41 within the slot is accomplished by adjustment means that interconnects the pin 41 and bracket assembly 22 for locating the position of the pivot means along the length of the slots 36. This interconnection is accomplished by an extensible member generally shown at 45 (FIGS. 3 and 4).

The extensible member 45 includes a threaded shaft 46 that is elongated and includes an eyelet 48 at one end for pivotably receiving pin 41. A nut assembly is rotatably mounted to the yoke to threadably receive the threaded shaft 46. The nut assembly includes a threaded block 51 having an inside collar 52 abutting an inside surface of the yoke base 35b. An outside lock ring 53 is affixed to the block 51 and slidably engages an outer surface of the base 35b. Collar 52 and ring 53 prevent axial movement of the nut assembly relative to the yoke. An adjusting tube 54 is affixed to the block 51 and lock ring 53. Tube 54 extends outwardly of the yoke 35. The tube end is provided with an aperture 56 that allows insertion of a turning rod (not shown). Torsion can be applied through the adjusting tube 54 to turn the nut within the yoke and cause relative axial movement of the threaded shaft 46.

It is important to note that the axis of the threaded shaft 46 is substantially aligned with the slots 36. Therefore, axial movement of shaft 46 will cause corresponding movement of the pin 41 within the slots 36. It will be noted that when the frames 12 and 16 are in the inoperative transport position, any axial movement of the pin will not cause corresponding pivotal movement of the frames since such movement will merely pivot the cylinder assembly about its axis at 27. However, when the frames are in the lowered, operative position, an angular component of the axial movement of threaded shaft 46 will be tranferred between the frames 12 and 16 to cause relative movement between them about the first axis at pivot 18.

A lock means is provided for selectively securing the nut assembly against rotation on the threaded shaft 46. The lock means includes lock ring 53 and a lock pin 59 (FIG. 4) which is selectivly placed through any one of several angularly spaced holes 60 formed through ring 53. The pin extends through a selected hole 60 and into a hole 61 formed in the yoke base 35b. When the pin interconnects the lock ring and yoke base, no rotational movement of the nut is allowed on the threaded shaft. This enables the operating depth of the implement to be set and locked.

Prior to operation of the present invention, the tool frame 12 is connected by its drawbar 14 to an appropriate towing vehicle. The cylinder assembly 21 is also connected by appropriate conventional hydraulic connectors to the available hydraulic pressure supply of the towing vehicle. The control is then ready for use.

The implement must first be elevated to the transport position before being moved to the work site. This is done by extending the cylinder assemby 21. In doing so, the piston shaft acts against the bracket assembly 22 through the extensible member 45 to urge the axle bar 17 downwardly about the first axis at pivot 18. The wheel 19, however, supports the axle bar against the ground surface. The tool frame and wheel frame 16 will therefore both pivot upwardly at the pivot 18, lifting the ground working implement to its raised transport position. The cylinder assembly is allowed a full extension or stroke to bring the tool frame to the transport position and to rephase the cylinders.

The implement can than be towed to the work site. At the work site, the appropriate controls are operated and the cylinder assembly is made to contract through its full stroke again rephasing each cylinder. In doing so, the tool frame and wheel frame 12 and 16 pivot downwardly at pivot 18, allowing the attached tool to engage and penetrate the soil to a selected operating depth. It is pointed out that this is done during forward motion of the implement to avoid possible damage to the ground working tools.

If adjustment of the implement operating depth is required, this can be accomplished by releasing lock pin 59 and turning the adjustment tube 54 while the implement is elevated. This causes axial movement of the threaded shaft 46, pushing or pulling the pin 41 toward one or the other slot ends. The force against the pin within the slots is transmitted through the now rigid cylinder assembly 21 to the tool frame. The forces transmitted will therefore cause relative pivotal movement between the tool frame and wheel frame and cause resulting change in the operating depth for the associated implement. Once the desired depth has been selected, the lock pin 59 is replaced and the field work may continue.

When it is desired to transport the implement, the appropriate control is operated to cause reextension of the cylinder assembly 21. Such extension again causes movement of the tool frame to the elevated transport position. This position is identical to the transport elevation prior to adjustment of the operating depth for the implement. This is so because at the transport position, the slots 36 lie along or in alignment with an arc centered on the pivot axis for the cylinder.

The pin 41 can be positioned at any location along slots 36 without affecting the resulting transport elevation of the implement. Such positioning of the pin along the slot lengths will vary only upon the operating depth of the implement. In all positions, movement of the cylinders between the operative position and transport position involves a full cylinder stroke. Rephasing cylinders connected in a series hydraulic circuit with the cylinder assembly 21 are therefore synchronized at both the fully retracted and fully extended cylinder positions.

It must be emphasized that the above specific disclosure relating to the specific geometric relationship of the described parts is but one example of its practical application. The relative positions of the cylinder bracket 26 and adjustment bracket assembly 22 can be reversed between the tool frame 12 and wheel frame 16.

The details of bracket assembly 22, which movably mounts the pivotal connection at pin 41, can also be varied to utilize equivalent "lost motion" connections or mounting arrangements, such as a variably positioned lever that would position the equivalent of pin 41 along a path equivalent to slot 36.

What I claim is:

1. A depth control for selectively adjusting the elevation of an agricultural tool relative to the ground surface in response to full extension or retraction of a cylinder assembly, comprising:

a tool frame;

a wheel frame mounting the tool frame for pivotal movement thereon about a first horizontal axis, the tool frame being movable between a first elevational position and a second elevational position;

a cylinder assembly;

first support means pivotally mounting one end of the cylinder assembly to a first one of said frames for movement about a second horizontal axis;

second support means mounted to the remaining frame;

pivot means mounted at the remaining end of the cylinder assembly for connecting the cylinder to said second support means about a third horizontal axis;

said second support means comprising guide means locating said pivot means along a path substantially aligned along an arc centered on the second axis when the tool frame is at the first elevational position; and adjustment means movable along an axis substantially aligned with the guide means and operably connected between the pivot means and the second support means for selectively locating the position of the pivot means along said guide means and for transferring an angular component of its movement between the frames about the first horizontal axis when the tool frame is at the second elevational position without affecting the position of the tool frame relative to the wheel frame when the tool frame is at its first elevational position.

2. The depth control as defined by claim 1 wherein the adjustment means comprises:

an extensible member having one end operably connected to the pivot means and a remaining end operably connected to the second support means, said extensible member being axially movable to locate the pivot means relative to the second support means by selectively positioning the pivot means along the guide means.

3. The depth control as defined by claim 1 wherein said adjustment means further comprises:

lock means for securing the pivot means at a selected position along the path.

4. A depth control for selectively adjusting the elevation of an agricultural tool relative to the ground surface in response to full extension or retraction of the cylinder assembly, comprising:

a tool frame;

a wheel frame mounting the tool frame for pivotal movement thereon about a first horizontal axis, the tool frame being movable between a first elevational position and a second elevational position;

a cylinder assembly;

a first bracket pivotally mounting one end of the cylinder assembly to a first one of said frames for movement about a second horizontal axis;

a second bracket fixed to the remaining frame;

an elongated slot on the second bracket substantially aligned along an arc centered on the second axis when the tool frame is at the first elevational position;

pivot means mounted at the remaining end of the cylinder assembly said pivot means being movably positioned along the slot for pivotally connecting the cylinder assembly and second bracket about a third horizontal axis; and adjustment means movable along an axis substantially aligned with the elongated slot and operably connected between the pivot means and the second bracket for selectively locating the position of the pivot means along the length of the slot and for transferring an angular component of its movement between the frames about the first horizontal axis when the tool frame is at the second elevational position without affecting the position of the tool frame relative to the wheel frame when the tool frame is at its first elevational position.

5. The depth control as defined by claim 4 wherein the adjustment means comprises:

an extensible member having one end operably connected to the pivot means and a remaining end operably connected to the second bracket, said extensible member being axially movable to locate the pivot means relative to the second support means by selectively positioning the pivot means along the elongated slot.

6. The depth control as defined by claim 4 wherein said adjustment means further comprises:

lock means for securing the pivot means at a selected position along the slot.

7. The depth control as defined by claim 4 wherein the adjustment means comprises:

an extensible member having a threaded shaft connected to the pivot means and a nut assembly rotatably mounted to the second bracket and threadably engaging the threaded shaft for moving the threaded shaft axially relative to the second bracket for selectively positioning the pivot means along the slot.

8. The depth control as defined by claim 7 wherein the axis of the threaded shaft is substantially aligned with the slot.

9. The depth control as defined by claim 4 wherein the pivot means comprises:

a cylindrical rod having opposite ends slidably received by the slot and pivotally mounting the remaining cylinder end and the adjustment means about the third horizontal axis.

* * * * *